(No Model.)
C. A. SNIDER.
GEARING FOR BICYCLES.
No. 511,169. Patented Dec. 19, 1893.
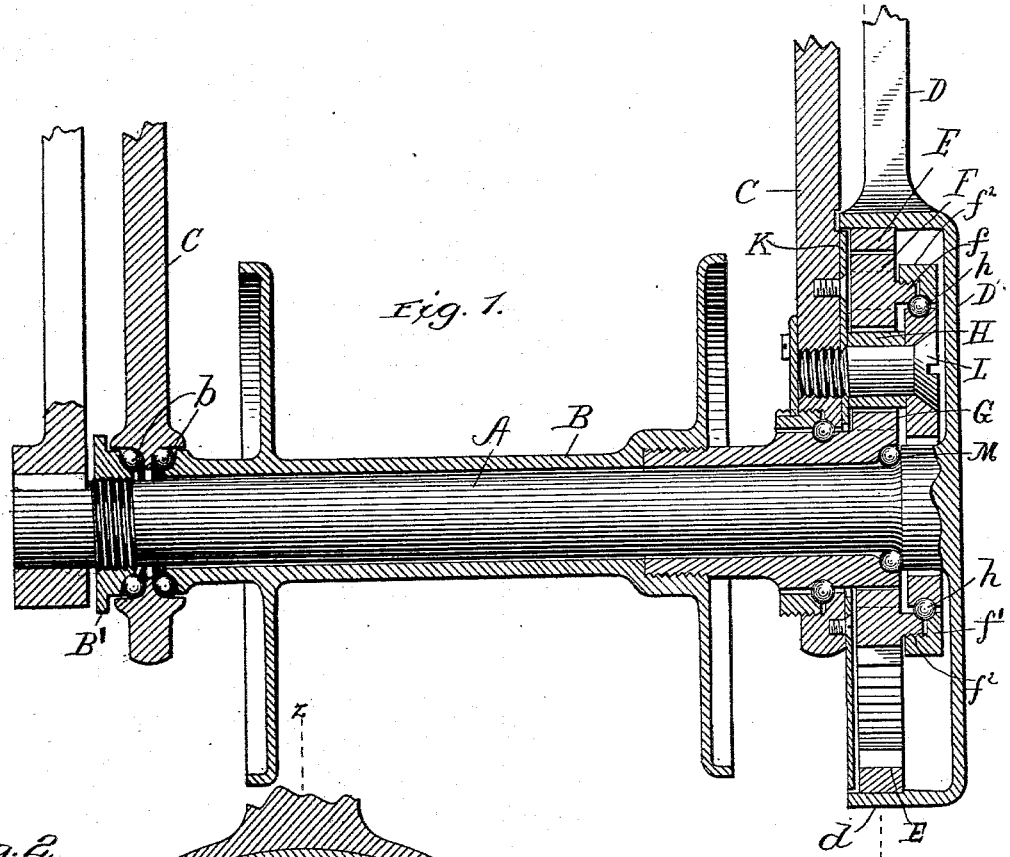
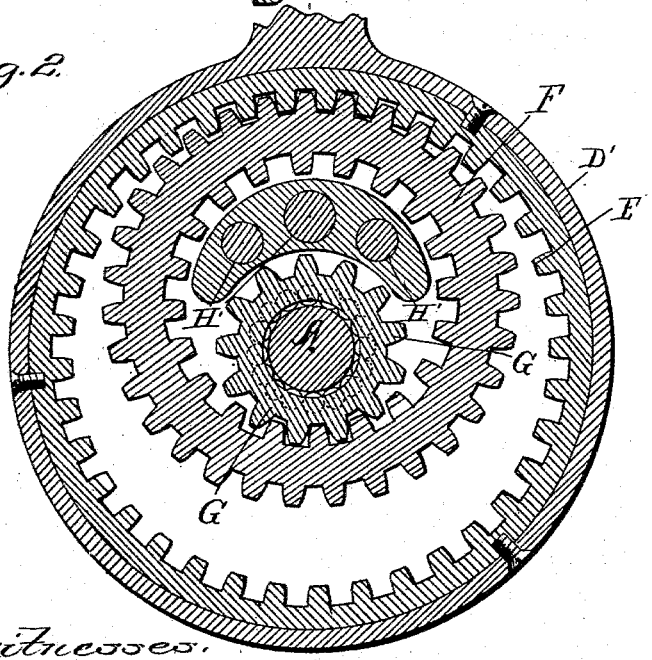
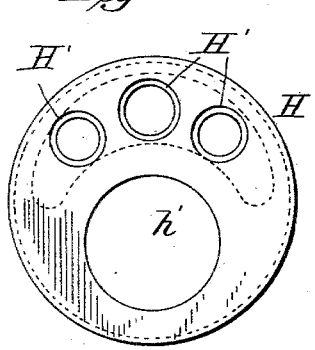

UNITED STATES PATENT OFFICE.

CHARLES A. SNIDER, OF COLUMBUS, GEORGIA.

GEARING FOR BICYCLES.

SPECIFICATION forming part of Letters Patent No. 511,169, dated December 19, 1893.

Application filed July 22, 1893. Serial No. 481,214. (No model.)

*To all whom it may concern:*

Be it known that I, CHARLES A. SNIDER, a citizen of the United States, residing at Columbus, in the county of Muscogee and State of Georgia, have invented certain new and useful Improvements in Gearing for Bicycles, of which the following is a specification, reference being had therein to the accompanying drawings.

This invention relates to an improvement in gearing for bicycles, and it consists in the construction and arrangement of parts hereinafter described and definitely pointed out in the claims.

The aim and purpose of the invention is the provision of a simple and powerful improved gearing for accelerating the movement of a wheel, without materially increasing the power. This object is attained by the construction illustrated in the accompanying drawings wherein like letters of reference indicate corresponding parts in the several views and in which—

Figure 1, is a sectional elevation on the line $x\ x$, Fig. 1. Fig. 2, is a vertical cross-section on the line $z\ z$, Fig. 1, and Fig. 3, is a detail view of the gear carrying plate.

In the drawings A represents the shaft, B the sleeve upon which the hub disks are secured and C the fork having the adjustable bearing B' for the balls $b$ interposed between the same and sleeve. On the outer end of the shaft is the crank arm D, having a cup shaped connecting portion D' integral therewith the open face of which is presented inwardly. On the interior of the outer horizontal flange $d$ of the cup shaped portion is an interior circular rack E.

F is a circular gear wheel having interior and exterior teeth, the outer teeth meshing with the teeth of the rack E, and the inner teeth meshing with a gear G, on the end of sleeve B. This wheel F is of an internal diameter greater than the diameter of the gear G, and is so arranged that there is a simultaneous engagement between the teeth thereof and the teeth of the rack E and gear G. To retain the wheel F, in this engaging position a circular flange $f$ is formed centrally on its outer face, having a screw threaded periphery and a curved bearing at its under side. On this projection or flange $f$ is secured the collar $f'$ having the female threaded flange $f^2$ the threads of which engage the threads of the flange $f$. The lower portion of the collar has a bearing which in conjunction with the bearing of the flange $f$ forms an adjustable semi-circular bearing.

H represents the carrying plate for the gear F. It consists of a plate having a semi-circular bearing in its periphery which registers with the semi-circular bearing of flange $f$ and collar $f'$ and between which are the balls $h$. The circumference of this plate H is slightly less than the interior circumference of the flange $f$ so that the flange $f$ and consequently the gear F are carried by the plate H. This plate H has an eccentric opening $h'$ therein, through which the shaft passes, whereby the gear F is held in an eccentric position relative to the shaft and in contact with the gear G and rack E. To secure the plate in a fixed position a series of three inwardly extending lugs H' are formed on its inner face, the same having hollow centers registering with apertures in the plate. These lugs occupy a position between the inner gear of the gear F and gear wheel G, and extended inwardly to and in close proximity to the dust guard K, carried by the fork.

L are bolts or screws passing through the plate H, and lugs H', and into the usual enlargement or bearing collar of the fork, thus rigidly securing the plate against turning on the shaft.

Interposed between the outer under edge of the sleeve B and the outer end of the shaft and crank connection is a series of balls M, suitable curved bearings being formed for the same.

The rack E is removably secured on the flange of the cup by having a series of screws N passing through the flange and into the rack.

The operation of the device is plain, in view of the above description. It is to be understood that a like gearing may be placed on the opposite end of the shaft.

It is evident that slight changes in the device illustrated and described can be made and substituted therefor without departing from the spirit of the invention.

The crank with the cup is integral with the shaft and the opposite end of the shaft is threaded to receive a suitable bearing ring.

The opposite crank is keyed on this threaded end. The sleeve is made in two sections united by a threaded joint so that the bearings may be readily adjusted.

Having thus described the invention, what is claimed as new, and desired to be secured by Letters Patent, is—

1. In a bicycle, gearing, the combination with a shaft, of a sleeve on the shaft, a fork, a bearing between the sleeve and fork, a crank, a cup shaped extension on the crank secured to the shaft, an internal gear rack on the cup, a gear on the sleeve, a gear wheel having inner and outer teeth, eccentrically surrounding the gear on the sleeve and engaging the teeth of the gear rack, a flange on the surrounding gear, an eccentric plate rigid on the fork and located at the side of the gear and an adjustable bearing between the plate and flange, substantially as described.

2. In a bicycle the combination with a shaft, of a sleeve on the shaft, a fork arm, an adjustable bearing between the arm and sleeve, a gear wheel on the sleeve, a crank, a cup shaped extension on the crank having connection with the shaft, an inwardly extending rack on the extension, a gear ring eccentrically surrounding the gear on the sleeve and having inner and outer teeth meshing respectively with the gear and rack, an outwardly extending flange on the ring gear, an adjustable ring carried by the flange, a carrying plate having a bearing in its periphery, and eccentrically mounted around the shaft, balls in the bearing of the carrying plate and a rigid connection between the plate and fork arm, substantially as described.

In testimony whereof I affix my signature in presence of two witnesses.

CHARLES A. SNIDER.

Witnesses:
W. F. SULLIVAN,
D. W. DIXON.